United States Patent [19]

Beer

[11] 3,900,528

[45] Aug. 19, 1975

[54] PROCESS FOR IMPACT MODIFICATION OF HIGH NITRILE POLYMERS

[75] Inventor: Ludwig A. Beer, Agawam, Mass.

[73] Assignee: Monsanto Company, St. Louis, Mo.

[22] Filed: Oct. 9, 1973

[21] Appl. No.: 404,448

[52] U.S. Cl. .......................... 260/876 R; 260/880 R
[51] Int. Cl. ............................................ C08f 19/08
[58] Field of Search ............. 260/879, 880 R, 876 R

[56] References Cited
UNITED STATES PATENTS

| | | | |
|---|---|---|---|
| 3,073,798 | 1/1963 | Baer | 260/880 |
| 3,288,886 | 11/1966 | Himei et al. | 260/880 |
| 3,636,138 | 1/1972 | Beer | 260/880 |
| 3,644,584 | 2/1972 | Fryd | 260/880 |
| 3,671,607 | 6/1972 | Lee | 260/876 R |
| 3,763,278 | 10/1973 | Griffith | 260/880 |

FOREIGN PATENTS OR APPLICATIONS 1,009,360   11/1965   United Kingdom................ 260/880

*Primary Examiner*—Joseph L. Schofer
*Assistant Examiner*—P. R. Michl

[57] ABSTRACT

Disclosed herein is a two-stage graft polymerization process for producing a grafted rubber which can be used to prepare high nitrile polyblends with good impact properties, good optical properties, low water vapor transmission and low oxygen permeability.

8 Claims, No Drawings

PROCESS FOR IMPACT MODIFICATION OF HIGH NITRILE POLYMERS

BACKGROUND OF THE INVENTION

1. Field of the Invention

The present invention relates to a process for grafting a particular butadiene-styrene rubbery substrate (hereinafter described) in two stages to provide a grafted butadiene-styrene rubber substrate with a high nitrile content in the outer shell. The resulting grafted rubber may be used as per se or blended with a high nitrile polymer matrix to form a polyblend.

2. Description of the Prior Art

In recent years rubber modified high nitrile polymers have been taught in the art for packaging applications where good impact resistance, good oxygen permeability and good water vapor transmission properties are required. The same polymers have been taught for use in external applications where, in addition to the above properties, good weatherability properties are required.

The present invention fulfills a need in the art by providing a process for preparing rubber modified high nitrile polymers which may be used to prepare polyblends which have good optical properties as well as good impact, good oxygen permeability, good water vapor barrier properties and good weatherability properties.

It is an object of the present invention to provide a method for making a novel graft polymer component having a particular butadiene-styrene rubbery substrate and a composite superstrate which is relatively rich in ethylenically unsaturated nitrile monomer.

SUMMARY OF THE INVENTION

It has now been found that the foregoing and related objects can be readily obtained by a process in which there is formed an admixture of a particular butadiene-styrene rubbery substrate and a first polymerizable monomer composition comprising a difunctional monomer, an ethylenically unsaturated nitrile, a monovinylidene aromatic hydrocarbon and an alkyl ester of acrylic or methacrylic acid. This composition is subjected to polymerization conditions to effect polymerization of the monomer formulation and grafting of a substantial portion of the polymer being produced onto the particular butadienestyrene rubbery substrate. The resulting graft copolymer has a superstrate to substrate ratio of at least 10:100 and is thereafter admixed with a second polymerizable monomer composition consisting of at least 55 percent by weight of an ethylenically unsaturated nitrile monomer. The second monomer composition is subjected to polymerization conditions to effect polymerization of the monomers thereof and to produce grafting of a substantial portion of the polymer being produced onto the graft copolymer to form a composite graft copolymer. In the composite graft copolymer, the grafted polymers of the first and second monomer compositions provide a superstrate containing a total of at least 40 percent by weight ethylenically unsaturated nitrile monomer.

Although the composite graft copolymer thus formed may be utilized per se for various applications as a rubber modified material such as those where acrylonitrile-butadiene-styrene (ABS) or styrene-acrylonitrile (SAN) materials are employed, it has especial utility as an impact modifier for high nitrile polymers. By proper selection of the chemical composition of the butadiene-styrene polymer substrate and of monomers and the amounts thereof grafted onto the rubber polymer substrate, the apparent refractive index of the composite graft copolymer can be closely matched to the refractive index of the high nitrile matrix polymer to provide a transparent composition having highly desirable impact strength, good chemical resistance and a balance of other properties. Such impact modification has been especially useful in the manufacture of nitrile polymer blends for packaging and other applications.

DESCRIPTION OF THE PREFERRED EMBODIMENTS

Nature of the Rubber Substrate

The particular butadiene-styrene rubbery polymer substrate onto which the monomers are grafted are copolymers of butadiene and styrene which contain from 68 to 72 percent of butadiene and correspondingly from 28 to 32 percent by weight of styrene based on the weight of the butadiene-styrene copolymer. Optionally, up to 5 percent by weight of the butadiene may be replaced with a nitrile monomer such as acrylonitrile or methacrylonitrile.

The butadiene-styrene rubbery substrate must have a refractive index in the range of from 1.5375 to 1.5425, a particle size in the range of from 0.06 to 0.2 microns before grafting, a gel content in the range of from 40 to 95 percent, a swelling index in the range of from 10 to 40, and a second order transition temperature (Tg) less than $-20°C$. and preferably less than $-40°C$. as determined by ASTM Test D-746-52T. The above specified refractive index range for the rubber substrate is required in order to have the refractive index of the rubber substrate in the same range as the refractive indices for the grafted superstrates and the high nitrile matrix in order to provide optimum optical properties. The above specified rubber particle size, gel content, swelling index and second order transition temperature is required in order to provide optimum impact properties.

The Polymerizable Monomer Compositions of the Superstrate

The first polymerizable monomer composition comprises (1) from 0.1 to 2 percent by weight, preferably 0.1 1 percent by weight, of a nonconjugated diolefin monomer, (2) from 0 to 30 percent by weight of an ethylenically unsaturated nitrile selected from the group consisting of acrylonitrile, and mixtures of acrylonitrile and methacrylonitrile which contain up to 20 percent by weight methacrylonitrile, (3) from 40 to 60 percent by weight of a vinylidene aromatic hydrocarbon monomer and (4) from 20 to 50 percent by weight of an alkyl ester of acrylic or methacrylic acid wherein the alkyl group contains from 1 to 8 carbon atoms, wherein the percent by weight referred to above is based on the total weight of the first polymerizable monomer mixture.

The nonconjugated diolefins employed in the practice of this invention are monomers which have two nonconjugated ethylenically unsaturated double bonds per molecule, such that at least one double bond reacts readily causing the diolefin to interpolymerize with the other monomers used in the first polymerizable monomer formulation. Preferably, these diolefins have two ethylenically unsaturated double bonds with a different degree of reactivity or having a crosslinking efficiency of less than one. These diolefins may be aliphatic, aromatic, aliphatic-aromatic, heterocyclic, cycloaliphatic, etc. Examples of suitable diolefins would include divinyl benzene, ethylene dimethacrylate, ethylene glycol dimethacrylate, triethylene glycol dimethacrylate, tetraethylene glycol dimethacrylate, polyethylene glycol dimethacrylate, allyl methacrylate, daillyl fumarate, diallyl maleate, vinyl crotonate, and nonconjugated alpha, omega diolefins of at least 5 carbon atoms such as 1,4-pentadiene, 1,7-octadiene, etc. Ethylene glycol dimethacrylate is the preferred difunctional monomer.

Exemplary of the monovinylidene aromatic hydrocarbons which are used in the superstrate are styrene, alpha-methylstyrene; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halosubstituted styrenes, e.g., 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. Mixtures of the abofe monovinylidene aromatic monomers may be employed. Styrene and alpha methyl styrene are preferred.

The alkyl esters of acrylic and methacrylic acids used in the first polymerizable monomer composition are those wherein the alkyl group contains from 1 to 8 carbon atoms, e.g., methyl, ethyl, propyl, butyl, 2-ethylhexyl, etc. Examples of such esters include methyl acrylate, ethyl acrylate, butyl acrylate, methyl methacrylate, butyl methacrylate, 2-ethyl hexylmethacrylate, etc. The preferred ester is methyl methacrylate. A particularly preferred first polymerizable monomer composition contains (1) 0.1 to 2 percent by weight of ethylene glycol dimethacrylate; (2) 20 to 30 percent by weight of acrylonitrile; (3) 40 to 60 percent by weight of styrene; and (4) 20 to 50 percent by weight of methyl methacrylate; wherein the percent by weight referred to above is based on the total weight of the first polymerizable monomer mixture.

The second polymerizable monomer composition contains from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile.

The second polymerizable monomer composition contains from 1 to 45 percent by weight of a monovinylidene aromatic hydrocarbon monomer of the type referred to above. Up to 10 percent of the monovinylidene aromatic hydrocarbon monomer can be replaced with a vinylidene monomer selected from the group consisting of alkyl vinyl ethers wherein the alkyl group contains from 1 to 4 carbon atoms, vinyl esters such as vinyl acetate and alkyl esters of acrylic and methacrylic acids wherein the alkyl groups contain from 1 to 8 carbon atoms.

The preferred monovinylidene aromatic hydrocarbons are styrene and alpha methylstyrene.

The preferred vinylidene monomers, which are used to replace up to 10 percent by weight of the monovinylidene aromatic hydrocarbon, include methyl vinyl ether, ethyl vinyl ether, methyl acrylate, ethyl acrylate, butyl acrylate and the corresponding methacrylates, especially methyl methacrylates.

The percent by weight referred to above in regard to the second monomer mixture is based on the total weight of the monomers in the second monomer mixture.

The Graft Polymerization Process

Although the method of the present invention has previously been described as being conducted with two distinct polymerization monomer formulations in two separate polymerization steps, it should be appreciated that the two steps can be blended into each other. Accordingly, the two formulations can be blended into each other in a process where monomers are added during the course of polymerization. In such a technique, the first monomer formulation would be provided by the monomers present initially during the first stage grafting reaction and thereafter the second stage monomer formulation would be added during the course of the polymerization reaction to provide the equivalent of the second or high nitrile monomer polymerization formulation as the grafting reaction progressed.

The amount of the first polymerizable monomer composition relative to the amount of substrate may vary fairly widely depending upon the efficiency of the grafting reaction and the composition of the formulation. As previously indicated, of the total graft superstrate provided by the two monomer compositions, at least 40 percent by weight must be formed from ethylenically unsaturated nitrile monomer. The weight ratio of the first monomer formulation to substrate will normally be about 15–150:100 parts by weight, and preferably about 25:120:100. It is essential that the superstrate to substrate ratio resulting from the polymerization of the first monomer formulation be at least 10:100 and preferably about 10–90:100. Since the barrier properties of the composition will vary with the amount of non-nitrile polymer content, it is generally desirable to minimize the amount of ungrafted polymer formed from the first polymerizable monomer mixture.

The ratio of the second polymerizable composition to rubbery polymer substrate also may vary fairly widely depending upon the amount of superstrate produced by the first polymerizable composition in view of the requirement that the nitrile monomer content comprise at least 40 percent by weight of the total graft superstrate. Generally, the ratio of the second monomer composition to rubber substrate will be about 20–250:100 and preferably about 40–150:100. For economy of operation, the grafting reaction is ideally conducted under relatively efficient conditions so as to minimize the amount of ungrafted interpolymer which is formed, although any ungrafted nitrile polymer would normally not adversely affect the barrier properties of the blend.

Various techniques are customarily employed for graft polymerizing the monomers of the superstrate onto the rubbery polymer substrate including mass, suspension, solution and emulsion polymerization techniques, and combinations thereof. Emulsions and suspension polymerization techniques have proven particularly useful.

In the emulsion graft polymerization process, the monomers and rubbery substrate are emulsified in a relatively large volume of water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate, sodium lauryl sulfate and other sodium soaps. Generally, the emulsifying agent is provided in amounts of about 1 to 10 parts by weight per 100 parts by weight of the monomers. The amount of water in which the monomers and rubbery polymer substrate are emulsified may vary depending upon the emulsifying agent, the polymerization conditions and the particular monomers. Generally, the ratio of water to monomer with alkali metal soaps will fall within the range of about 80–300:100, and preferably about 150–250:100. The aqueous latex formed in the emulsion polymerization of the rubbery polymer substrate may provide the aqueous medium into which the monomers are incorporated with or without additional emulsifying agents, etc. However, the rubbery polymer may be dispersed in the monomers and the mixture emulsified, or a latex thereof may be separately prepared.

Although actinic radiation and both water-soluble and monomer-soluble peroxy-type and perazo-type catalysts with or without a reducing agent to form a redox system may be employed for the graft polymerization reaction, it has been found highly advantageous to use a redox system with a water-soluble catalyst for emulsion polymerization reactions. Redox systems offer the advantage of permitting the use of slower catalysts with equivalent conversion periods.

Exemplary of the water-soluble peroxy catalysts are the alkali metal peroxides; the alkali metal and ammonium persulfates, perborates, peracetates and percarbonates; and hydrogen peroxide. Exemplary of the monomer-soluble peroxy and perazo compounds are di-tert-butyl peroxide, di-benzoyl peroxide, di-lauroyl peroxide, di-oleyl peroxide, di-toluyl peroxide, di-tert-butyl diperphthalate, di-tert-butyl peracetate, di-tert-butyl perbenzoate, dicumyl peroxide, di-tert-butyl peroxide, di-isopropyl peroxy dicarbonate, 2,5-dimethyl-2,5 di-(tert-butylperoxy) hexane, 2,5-dimethyl-2,5-di(-tert-butyl peroxy) hexyne-3, di-tert-butyl hydroperoxide, cumene hydroperoxide, p-menthane hydroperoxide, cyclopentane hydroperoxide, diisopropylbenzene hydroperoxide, p-tert-butyl-cumene hydroperoxide, pinane hydroperoxide, 2,5-dimenthylhexane, 2,5-dihydroperoxide, etc.; azo-di-isobutyonitrile; and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

Exemplary of the reducing agents which may be employed are alkali metal and ammonium sulfites, hydrosulfites, metabisulfites, thiosulfates, sulfinates, alkali metal formaldehyde sulfoxylates, ascorbic acid, dioxyacetone, dextrose, etc. Various other reducing agents for redox systems may also be employed. The amount of reducing agent will be about 0.001 to 1.0 percent by weight, and preferably on the order of 0.005 to 0.5 percent by weight of the polymerizable monomer formulation, depending on the catalyst and the amount thereof. Minute amounts of activators or promoters such as ferrous salts and copper salts may be included in the redox systems.

Molecular weight regulators may be included in the formulation for the graft polymerization reaction so as to control the molecular weight and achieve the desired properties. Exemplary of such molecular weight regulators are alkyl mercaptans and terpenes, specifically N-dodecyl mercaptan, tertdodecyl mercaptan, n-butyl mercaptan, isopropyl mercaptan, terpinolene, d-limonene, etc., or their blends.

The particular polymerizaton conditions will vary with the monomer formulation, the catalyst and the polymerization technique. Generally, the reaction will increase with an increase in temperature although a limiting factor is possible deterioration in product properties and also a tendency to produce problems in maintaining latex stability. Generally, temperatures of about 30° to 100° Centigrade and pressures of about 0–50 p.s.i.g. have been found suitable for a fairly efficient emulsion graft polymerization reaction. Preferably, an inert atmosphere is employed over the polymerizing latex.

After the polymerization reaction has proceeded to the desired degree of conversion of the monomers, which will normally be more than 90 percent, any unreacted monomers should be stripped. After the graft polymerization, the graft copolymerblend may be recovered from emulsion by various techniques of coagulation in the form of a crumb, or by evaporation, and is washed for subsequent processing. Alternatively, the latex may be combined with a latex of the matrix polymer and coagulated or spray dried therewith. The amount of ungrafted interpolymers produced by the graft polymerization reaction will vary with the type and efficiency of the graft reaction and the ratio of monomer formation to rubbery polymer substrate in the charge. By these factors, the amount of ungrafted polymer in an emulsion reaction will normally vary within the range of about 10 to 150 parts of grafted rubbery polymer substrate with the higher ratios being produced by high monomer/substrate charges.

The Matrix Interpolymer

Generally, it is advantageous to conduct an emulsion graft polymerization reaction under conditions which are reasonably efficient so that the rubbery content of the emulsion product will range from about 25 to 65 percent thereof. Normally, the rubbery substrate content desired for the polyblends of the present invention will be in the range of 3 to 50 percent by weight and preferably 5 to 20 percent. Thus, it is generally preferred to prepare matrix interpolymer by a separate reaction and this matrix interpolymer is then blended with the graft polymer component which may include (and will normally include) some ungrafted interpolymer.

The matrix polymer contains from 55 to 85 percent, preferably 60 to 85 percent by weight, based on the total weight of the polymer, of an ethylenically unsaturated nitrile monomer selected from the group consisting of acrylonitrile and mixtures of acrylonitrile and methacrylonitrile which contain up to 20 percent by weight of methacrylonitrile based on the total weight of acrylonitrile and methacrylonitrile and from 15 to 45 percent of a monovinylidene aromatic hydrocarbon monomer of the type referred to above. Up to 10 percent of the monovinylidene aromatic hydrocarbon monomer can be replaced with a vinylidene monomer selected from the group consisting of alkyl vinyl ethers, wherein the alkyl group contains from 1 to 4 carbon atoms, vinyl esters such as vinyl acetate; and alkyl esters of acrylic and methacrylic acids wherein the alkyl groups contain from 1 to 8 carbon atoms. The preferred monovinylidene aromatic hydrocarbons are styrene and methyl styrene. The preferred vinylidene monomers which can be used to replace up to 10 percent of the monovinylidene aromatic hydrocarbon include methyl vinyl ether, ethyl vinyl ether, methyl acrylate, ethyl acrylate, butyl acrylate and the corresponding methacrylates, especially methyl methacrylate.

Preferably, the composition of the matrix polymer is substantially the same as the composition of the second polymerizable monomer composition.

The method used to prepare the matrix interpolymer may be any which is commonly practiced in the art; the polymerization may be effected *en masse*, in solution or with the monomer in an aqueous dispersion as an emulsion or suspension. From the standpoint of economics and process control, highly suitable polymers can be prepared by a method in which the monomers are suspended in water since emulsion polymerization tends to introduce coloring impurities in the polymer by reason of the salts used for coagulation, the emulsifying agents, etc.

Since transparent blends are desirable for many applications, the refractive index of the matrix interpolymer should closely approximate the apparent refractive index of the graft copolymer component. Although the refractive index may be measured in each instance, it is possible to present graphically the refractive indices of the various resinous and rubber interpolymers and then calculate the refractive index for the graft copolymer component.

Other Components

Various other optional materials may be added to the compositions of the present invention depending upon the intended use and nature thereof such as, for example, plasticizers, dyes, pigments, stabilizers, antioxidants, lubricants, processing aids and fillers. The amount and nature thereof will determine the possible effect upon the transparency of the blends. Generally, it is necessary to incorporate stabilizers and antioxidants to prevent degradation of the graft polymer component. Although the stabilizers and antioxidants may be incorporated at the time of blending of the components into the final polyblend, generally it is most advantageous to incorporate these materials into the individual components after they are formed so as to minimize the tendency for degradation or oxidation during processing and storage.

Formation of the Polymer Blends

The final polymer blends may be prepared by admixing the components thereof in any of the customary ways including mill rolling, extrusion blending, etc. When the matrix polymer is prepared by an emulsion polymerization process, the latex thereof may be admixed with a latex of the graft copolymer blend and the mixed latex coagulated, washed and dried.

Generally, the polymer blends may contain 3 to 50 percent by weight of rubber provided by the rubbery substrate of the graft copolymer blend and the preferred composition will normally contain about 5 to 20 percent. Polymer blends produced in accordance with the present invention are substantially transparent, i.e., the transmittance through a molded specimen of 0.1 inch in thickness at 550 millimicrons wave length may have a value of at least 85 percent and generally considerably greater. In fact, suspension matrix polymers having a definite yellow cast may be brought to a clear less yellow blend when admixed with a suitably formulated graft copolymer component. For a high degree of transparency, the refractive indices of the graft copolymer blend and matrix polymer must be closely matched, and the average particle size of the graft copolymer component should be less than about 0.4 micron. Yellowish coloration can be neutralized by incorporation of the appropriate blue dyes. However, blends which may be produced in accordance with the invention afford significantly advantageous transparency enabling their application to packaging, laminating and other uses where transparency is advantageous and where the remaining balance of properties offers significant advantages.

Properties and Processing of the Polyblends

The polyblends of the present invention may be formed in conventional processing equipment including injection molding apparatus, blow molding apparatus and extrusion apparatus. In addition, the polyblends may be compression molded if so desired. The processability of the polyblends is satisfactory for use in conventional equipment without the need for employing solvents, lubricants or other flow modifiers.

Packaging sheet materials may be prepared from the polyblend by extrusion, calendering, casting and by other means well known to those skilled in the art. Bottles and containers may be made by any of the conventional methods such as blow extrusion, injection molding, vacuum forming, etc. When the sheet materials of the polyblends of this invention are subjected to uniaxial or biaxial orientation, still further improvements in the mechanical properties are noted. When the films are so oriented, it is preferred that they be stretched at least about 300 percent in one or both directions. It is further preferred that the stretching be carried out at a rate of at least about 2000 percent per minute. The preferred rate of stretching ranges 10,000–20,000 percent per minute.

Biaxial stretching can be effected in a single or continuous operation. In piece operation, a lazy-tongs-type cross-stetcher can be used to advantage, whereas in continuous-type operations either tenter-type cross-stretching frames or blow-extrusion techniques can be used. When tenterframes are used, the differential in speed between the front and rear rollers develops longitudinal stretching, while simultaneously the lateral spacing of the frame develops transversel stretching so that the sheet material is biaxially stretched in both directions.

Although the polyblends of the present invention have been indicated as being formed by a single graft polymerization component, it will be appreciated that the polymerization graft component need not be homogeneous. It may be comprised of two or more polymerization graft components for benefits which may be obtained thereby. Thus, although the graft polymer of the present invention will have a total superstrate to substrate ratio of 15–200:100 and preferably 20–150:100, one particle may have a ratio of 20–45:100 and another may have a ratio of 55–150:100 with the amounts thereof being varied. Similarly, the size of the particles may be multimodal or broadly distributed.

In addition, the polyblends of the present invention may be mechanically blended with other polar polymers to form "alloys" offering certain advantageous properties for given applications or to facilitate lamination. Among such polar polymers are polycarbonate, polyvinyl chloride and polysulfone resins; generally, such polar polymers may be included in amounts of up to 30 percent by weight of the total mechanical blend.

The following examples are set forth in illustration of this invention and are not to be construed as a limitation thereof. All parts and percentages given are by weight unless otherwise indicated.

EXAMPLE 1

This example illustrates the preparation of a butadiene-styrene rubber of the type used in the present invention.

A butadiene-styrene rubber, which contains 70 percent by weight of butadiene, and 30 percent by weight of styrene, is prepared using the following charge:

| | |
|---|---|
| Deaerated distilled water | 300 parts by weight |
| Rubber reserve soap (RRS) | 6.0 |
| Potassium chloride | 1.0 |
| Tert.-didecyl mercaptan (TDM) | 0.8 |
| Ethylene glycol dimethacrylate (EGDM) | 1.8 |
| Potassium sulfate ($K_2S_2O_8$) | 0.6 |
| Styrene | 60.0 |
| Butadiene (distilled) | 140.0 |

The above ingredients are charged to a reaction vessel, heated at 55°C. for 20 hours to a degree of conversion of 96%. The ethylene glycol dimethacrylate is used to crosslink the rubber. The resulting butadiene-styrene latices are characterized as follows:

| | |
|---|---|
| Solids | ~40% by weight |
| pH | 8.5–8.8 |
| Surface tension | 68–72 dynes/cm |
| Average particle size | 0.09 to 0.1 micron |
| Gel content | 89% to 93% |
| Swelling index | 12 – 16 |
| Refractive index $n_d^{25}$ | 1.5375–1.5395 |
| Tg | <–40°C. |

EXAMPLE 2

This example illustrates the use of a two-stage graft polymerization reaction to prepare the grafted polymers of the present invention.

Twenty-five hundred parts of the latex prepared in Example 1 above, after dilution to 20 percent rubber solids and addition of 1 percent, by weight of rubber, of sodium lauryl sulfate, are charged to a reactor and heated under nitrogen and with agitation to about 60°C. An aqueous solution of 1.0 parts of sodium formaldehyde sulfoxylate and a small quantity of chelated iron is added before graft monomer addition. To this latex is continuously added over a one hour period a first monomer composition of 100 parts acrylonitrile, 200 parts styrene, 100 parts methyl methacrylate and 4 parts ethylene glycol dimethacrylate. During monomer addition, 1 part of potassium persulfate in aqueous solution is charged to the reactor. Stirring is continued during the addition of the first monomer composition and is continued for an additional period of 1 hour thereafter. Then, 0.8 part of sodium formaldehyde sulfoxylate and 0.8 part of potassium persulfate in aqueous solution is added to the latex and a second monomer composition of 130 parts acrylonitrile, 70 parts styrene and 2 parts tert-dodecyl mercaptan is continuously added to the reactor over a one-half hour period. Towards the end of the second monomer composition addition, a solution of 11 parts sodium lauryl sulfate is charged to the reactor, and agitation and heating are continued for about 30 minutes. The latex is then cooled to 25°C. and 5 parts of a conventional antioxidant is added to the batch. The latex is then coagulated in a hot aqueous magnesium sulfate solution, the coagulum is filtered, washed with water and dried. The crumb is fused and sheeted on a two-roll mill at 160°C. Thereafter test specimens are compression molded at 175°C. and 5000 psi for 5 minutes.

Optical properties on the molded specimens are determined in accordance with ASTM Test D-1003-52 and impact properties are determined in accordance with ASTM Test D-256-56. The properties of the test specimens are listed in Table I below.

EXAMPLE 3 (CONTROL)

For comparison a graft copolymer is prepared by a one step grafting procedure wherein the grafted superstrate is of substantially uniform composition throughout. In this test, the procedure of Example 2 is substantially repeated. However, to the 2500 parts of rubber latex, a mixture of 390 parts acylonitrile, 210 part styrene and 6 parts tert.-dodecyl mercaptan is added continuously over a ninety-minute period. The total amount of reducing agent and of persulfate used is the same as in Example 2. The latex is stirred at 60°C. for 1 hour after monomer addition and the graft copolymer is recovered, processed and molded as in Example 2. The properties of the test specimens are listed in Table I below.

TABLE I

| Property Tested | Example 2 Two-stage Graft | Example 3 Single Stage Graft |
|---|---|---|
| Tensile stress (psi) | | |
| at yield (10% strain/minute) | 2640 | 2910 |
| at failure (100% strain/minute) | 3630 | 3770 |
| Percent elongation | | |
| at yield | 4.1 | 4.6 |
| at failure | 197 | 121 |
| Tensile modulus (psi × $10^5$) | 1.15 | 1.27 |
| Percent haze (60 mil at 550 mm) | 2.8 | 3.5 |
| Yellowness index | 5.2 | 26.2 |

TABLE I-continued

| Property Tested | Example 2<br>Two-stage Graft | Example 3<br>Single Stage Graft |
| --- | --- | --- |
| Refractive index | 1.5435 | 1.5428 |

The above test results show the improved optical properties which are obtained with the graft copolymers of the present invention.

EXAMPLE 4

This example illustrates polyblends made from an acrylonitrile/styrene copolymer and the graft copolymers produced in Examples 2 and 3 above. The copolymer utilized for these blends is a copolymer of 63 percent by weight acrylonitrile and 37 percent by weight styrene previously prepared by conventional suspension polymerization. The copolymer has a specific viscosity (0.1 g/100 ml DMF) of 0.078 and a yellowish index of 35.5 and 1.5 percent haze.

The blends are compounded by extrusion and test specimens are molded on a reciprocating screw injection molding machine at 200°C. barrel temperature.

Optical and impact properties are determined as outlined above. Injection molded plaques, 0.1 inch thick, are used for determination of haze at 550 mm wave length and yellowness is determined on the same specimen with a IDL Color Eye. Izod impact strength is determined on ½ inch × ½ inch injection molded bars with 0.10 mil notch radius. The properties of the test specimens are listed in Table II below.

TABLE II

PROPERTIES OF POLYBLENDS

| | Graft Copolymers | | | |
| --- | --- | --- | --- | --- |
| | Example 2<br>Two Stage Graft | | Example 3(Control)<br>Single Stage Graft | |
| Percent graft copolymer in blend | 0 | 26 | 33 | 26 | 33 |
| Percent rubber in blend | 0 | 10 | 15 | 10 | 15 |
| Izod impact strength (ft.-lbs./in) | 0.4 | 2.3 | 5.8 | 1.8 | 3.7 |
| Percent haze | 1.6 | 2.1 | 2.3 | 15.8 | 20.1 |
| Yellowness index | 35.5 | 26.8 | 23.2 | 42.1 | 45.6 |

As can be seen from the results in Table II, the blends prepared using graft copolymers prepared according to the present invention provide significantly improved proportions both in transparency, as shown by relatively low haze, color and in impact resistance.

EXAMPLE 5

This example further illustrates the improved properties which are obtained with the two-stage grafted rubbers of the present invention.

PART A

Preparation of Two-Stage Grafted Rubber

A butadiene-styrene rubber latex with 71 percent butadiene and 29 percent styrene having a gel content of 91 percent, a swelling index of 15.2, a refractive index of 1.5375, a particle size in the range of from .06 to 0.2 micron and a Tg of less than −40°C. is used in this example.

To 2500 parts of this latex, diluted to 20 percent rubber content and stabilized with 1 percent on rubber weight of sodium lauryl sulfate are added under nitrogen and agitation at 60°C., 0.8 part sodium hydrosulfite and trace quantities of ferrous sulfate and ethylene diamine tetraacetic acid disodium salt. A first monomer composition of 150 parts styrene, 150 parts methyl methacrylate, 3 parts ethylene glycol dimethacrylate and 0.75 parts di-isopropyl benzene hydroperoxide (100 percent active) is continuously added to the reaction vessel over a period of 45 minutes while maintaining a temperature differential of about 4°C. between the cooling jacket temperature and the temperature of the polymerizing latex. Agitation is continued for 30 minutes thereafter at 60°C. then there is added 0.8 part sodium hydrosulfite and continuously a second monomer composition of 240 parts acrylonitrile, 60 parts styrene, and 0.5 part n-butyl mercaptan. A solution of 0.8 part potassium persulfate is also added continuously over a 45 minute period. The latex is maintained with stirring at 60°C. for 1 hour after the termination of monomer addition. After cooling, 7.5 parts of a conventional antioxidant mixture in the form of a dispersion are added to the latex, which is then coagulated in an aqueous solution of magnesium sulfate at 75°C. to obtain a fine granular product which is washed and dried.

PART B (CONTROL)

Preparation of Single Stage Grafted Rubber

The procedure of Part A is substantially repeated except that a mixture of 240 parts acrylonitrile, 210 parts styrene, 150 parts methyl methacrylate and 1 part n-butyl mercaptan, which contains no difunctional monomer, is added continuously with a solution of 1.5 parts potassium persulfate over a period of 1½ hours as opposed to the two-stage monomer mixtures used in Part A.

PART C

Blending of Grafted Rubbers with Matrix

The graft copolymers prepared in Parts A and B above are blended with an acrylonitrile/styrene (63/37% by weight) polymer previously prepared by conventional polymerization so as to provide blends containing 15 percent of the graft copolymer substrate in the blends. The blends are compounded and tested as outlined in Example 4 above. The properties of the test specimens are found to be as follows:

| | Graft Copolymers | |
|---|---|---|
| | Part A Two-Stage Graft | Part B Single Stage Graft |
| Izod impact strength ft-lbs/in. notch | 8.6 | 5.9 |
| Percent haze | 1.8 | 15.6 |
| Yellowness index | 21.8 | 39.2 |
| Melt viscosity, poises at 200°C., | | |
| shear rate 100 sec$^{-1}$ | 22500 | 28000 |
| 1000 sec$^{-1}$ | 5100 | 5000 |

Again, it can be seen that the blends utilizing graft copolymers prepared in accordance with the present invention evidence significantly improved properties as compared to blends of similar compositions utilizing a graft copolymer having a substrate of substantially uniform composition throughout.

EXAMPLE 6

This example illustrates a two-stage grafted rubber which is blended with an acrylonitrile/styrene polymer matrix which contains 68 percent by weight of acrylonitrile and 32 percent styrene. A latex of a butadiene/styrene rubbery copolymer (68/32) having a Tg of less than −40°C., an average particle size of 0.11 microns, a gel content of 87.5 percent, a swelling index of 13.6, and a refractive index of 1.5396, is grafted in two stages. The first stage graft is carried out using a monomer composition containing 15 percent acrylonitrile, 45 percent styrene, 4 percent methyl methacrylate and 0.8 percent of ethylene glycol dimethacrylate wherein the percent is by weight based on the total monomer weight in the first monomer composition. The second stage graft is carried out using a monomer composition containing 65 percent acrylonitrile, 2 percent methacrylonitrile and 33 percent styrene containing 0.5 percent by weight tert-dodecyl mercaptan based on the total monomer weight in the second monomer mixture. A combination of potassium persulfate and sodium thiosulfate is used as redox initiator system for the grafting reaction. The ratio of substrate/first stage graft superstrate/second stage graft superstrate is 1:0.8:0.4.

The average particle size after grafting is found to be 0.13 microns. The graft copolymer is fused and sheeted by roll-milling and then the mechanical and optical properties are determined on compression molded test specimens. The physical and mechanical properties of the test specimens are found to be as follows:

| | |
|---|---|
| Tensile stress (psi) | |
| at yield | 2150 |
| at failure | 3360 |
| Percent elongation | |
| at yield | 3.8 |
| at failure | 223 |
| Tensile modulus (psi × 10$^5$) | 1.08 |
| Percent haze (60 mil, 550 mm) | 1.2 |
| Yellowness index | 12.5 |
| Refractive index n$_d^{25}$ | 1.5404 |

The graft copolymer is then blended with a 68/32 acrylonitrile/styrene copolymer, which was previously prepared by conventional suspension polymerization, a various ratios to provide a rubber substrate level in the blends of 7.5 percent, 10 percent, and 15 percent. The blends are compounded by extrusion and test specimens are obtained by injection moldings as outlined above. The properties of the test specimens are found to be as follows:

| | Rubber Content | | | |
|---|---|---|---|---|
| | 0 | 7.5% | 10% | 15% |
| Percent haze (100 mil, 550 mm) | 1.2 | 1.1 | 1.3 | 1.5 |
| Yellowness index | 46.6 | 39.6 | 33.8 | 31.5 |
| Refractive index n$_d^{25}$ | 1.5405 | 1.5410 | 1.5412 | 1.5411 |
| Izod impact (ft.lbs/in.) | 0.4 | 1.25 | 1.81 | 9.6 |
| Density, grams/cc | 1.128 | 1.112 | 1.105 | 1.090 |
| FDI (falling dart impact) Ft. lbs. (1) | — | 4.2 | 16.0 | 99.9 |

(1) FDI test conducted on 3 × 4 × 0.1 inch molded plaques using a 1½ steel tip dart using the Bruce Staircase Method.

The above results further illustrate the superior properties which are obtained with the graft copolymers of the present invention.

EXAMPLE 7

This example illustrates the blending of two latices to obtain the rubber modified polymer blends of the present invention.

A graft copolymer is prepared in a two-stage polymerization procedure by grafting 100 parts of the butadiene/styrene rubber prepared in Example 1 with 60 parts of a styrene/acrylonitrile/methyl methacrylate/ethylene glycol dimethacrylate mixture (50/25/25/0.8 % by weight) and 60 parts of an acrylonitrile/styrene mixture (65/35% by weight) in two consecutive steps using the procedure outlined in Example 2. The resulting latex is blended with a latex of acrylonitrile/styrene/methyl methacrylate (60/35/5% by weight) so as to provide a polyblend having a solids content of 26 percent by weight providing a rubber content of 10 percent in the polyblend. The polyblend is spray dried and the resulting powder blend is compounded by extrusion into pellets which are further extruded into a clear transparent sheet having a refractive index of 1.5425. In a falling dart drop test (one inch tip) at a drop height of 2 feet, a ductile failure pattern and a strength of 0.15 foot pounds/ mil is obtained, further illustrating the good physical properties of the polyblends of the present invention.

EXAMPLE 8

This example illustrates the preparation of three different two-stage graft copolymers. In part A no difunctional monomer is used, in Part B the difunctional monomer is omitted from the first monomer mixture but included in the second monomer mixture, and in Part C the difunctional monomer is included in the first monomer mixture in accordance with the teachings of the present invention.

Each example uses a latex of a 70/30 butadiene/styrene rubbery copolymer having an average particle size of 0.151 microns, as determined by turbidity measurement, a gel content of 48.0 percent, a refractive index of 1.5381, a swelling index of 37.7 and a Tg less than −40°C. The two-stage grafting procedure is carried out at 50°C. using a persulfate/sulfoxylate/iron redox initiator system.

PART A (CONTROL)

In this example the graft polymerization procedure of Example 2 is substantially repeated with the exception that the first monomer composition, which contains 50 percent by weight styrene, 25 percent methyl methacrylate and 25 percent acrylonitrile, does not contain a difunctional monomer.

PART B (CONTROL)

In this example the first monomer composition is the same as in Part A above. However, the second monomer composition contains 65 percent by weight of acrylonitrile, 35 percent styrene and 0.5 percent by weight of allyl methacrylate difunctional monomer.

PART C

For comparison purposes a graft copolymer is prepared as in Parts A and B but using a first monomer composition containing 0.5 percent by weight of allyl methacrylate based on the total weight of monomers in the mixture.

Except for the presence or absence of a difunctional monomer, the composition of the first and second stage monomer mixtures and the graft ratios are the same for Parts A, B and C.

The graft copolymers are recovered by coagulation with calcium chloride and optical and mechanical properties are determined on compression molded specimens (125 mil thickness). The properties of the test specimens are found to be as follows:

|  | Part A (Control) | Copolymer Part B (Control) | Part C |
| --- | --- | --- | --- |
| Tensile stress (psi) |  |  |  |
| at yield | no yield | 1690 | 2580 |
| at failure | 920 | 2000 | 3440 |
| Percent elongation |  |  |  |
| at yield | — | 3.1 | 4.1 |
| at failure | 65 | 125 | 233 |
| Tensile modulus (psi × 10$^5$) | 0.44 | 0.83 | 1.17 |
| Percent haze (550 mm) | 12.6 | 13.5 | 5.1 |
| Yellowness index | 11.8 | 13.1 | 12.0 |
| Refractive index, n$_d^{25}$ | 1.5428 | 1.5430 | 1.5425 |

The tensile test results reported above indicate that the strength of the graft copolymer prepared in the absence of a difunctional monomer in the first graft monomer composition (Part A) is lower than that of the graft copolymer prepared by the method of the present invention using a difunctional monomer in the first monomer composition (Part C). The strength properties of the graft rubber obtained by a two-stage procedure using a difunctional monomer in the second monomer composition (Part B) are better than those of the graft copolymer, which contains no difunctional monomer (Part A), but still lower than those of the graft copolymer prepared using a difunctional monomer present in the first stage monomer composition (Part C).

The graft copolymers prepared by procedures A, B and C are blended with a 65/35 acrylonitrile/styrene copolymer previously prepared by conventional suspension polymerization to provide blends containing 15 percent of the graft copolymer substrate providing a rubber content of 15% in the polyblend. The polyblends are compounded by extrusion and injection molded into test specimens. The properties of the test specimens are found to be as follows:

|  | Graft Copolymer in Blend | | |
|  | Part A | Part B | Part C |
| --- | --- | --- | --- |
| Izod impact strength, ft-lbs/in. of notch | 1.2 | 2.3 | 7.4 |
| Percent haze (550 mm, 100 mils) | 36.4 | 16.5 | 2.1 |
| Yellowness index | 25.3 | 28.2 | 21.3 |

The foregoing results further illustrate the improved properties which are obtained when using a two-stage graft polymerization procedure wherein the first stage contains a difunctional monomer in accordance with the teachings of the present invention.

EXAMPLE 9

This example illustrates the use of a vinyl crotonate difunctional monomer in the first monomer mixture of a two-stage grafting procedure. It also illustrates various grafting levels and the preparation of polyblends in accordance with the present invention.

Three different graft copolymers are prepared by the procedure described in Example 2 above using a rubber latex containing 69.3 percent by weight butadiene and 30.7 percent by weight styrene and having a Tg less than −40°C., a gel content of 87.5 percent, a swelling index of 16.3, a particle size of about 0.1 microns average and a refractive index of 1.5376.

The first graft monomer composition contains 1 percent by weight of vinyl crotonate difunctional monomer, the second monomer composition contains 1 percent of a tertiary-dodecyl mercaptan chain transfer agent, both weight percents based on the total monomer weight in the respective mixtures. The graft ratios of substrate:first stage graft: second stage graft are 1:0.5:0.5, 1:0.6:0.6 and 1:0.8:0.4.

The graft copolymers prepared above are blended with an acrylonitrile/styrene (63/37% by weight) previously prepared by conventional suspension polymerization, to provide polyblends having a rubber content of 15 percent by weight. The polyblends are injection molded into ½ × ½ × 5 inch bars, 3 × 4 × 0.1 inch plaques and ½ × ⅛ × 6½ inch tensile bars which are then tested for physical properties. The properties of the test specimens are found to be as follows:

| Graft Ratio | 1:0.5:0.5 | 1:0.6:0.6 | 1:0.8:0.4 |
|---|---|---|---|
| Tensile stress (psi) | | | |
| at yield | 7560 | 8050 | 7350 |
| at failure | 6750 | 6780 | 6800 |
| Percent elongation | | | |
| at yield | 4.2 | 4.5 | 4.1 |
| at failure | 48.9 | 42.7 | 47.7 |
| Tensile modulus, psi × $10^5$ | 4.3 | 4.2 | 4.2 |
| Refractive Index, $n_d^{25}$ | 1.5430 | 1.5445 | 1.5437 |
| Izod impact | 3.8 | 3.6 | 3.9 |
| FDI, ft-lbs. | 64 | 62 | 91 |
| Percent haze (550 nm) | 2.8 | 3.5 | 2.5 |
| Yellowness index | 28.1 | 25.6 | 23.3 |
| Density, grams/cc | 1.0875 | 1.0899 | 1.0855 |

The polyblends of this invention exhibit oxygen permeability of less than 6.5 cc of oxygen for a film of 1 mil thickness and 100 square inches over a period of 24 hours at one atmosphere (760 mm.) of oxygen and at 73°F., and a water vapor transmission rate (WVT) of less than 8.5 grams for such film of equivalent dimensions over a 24 hour period maintained at 100°F. and 95 percent relative humidity (R.H.), as determined by ASTM Method D-1434-63 and ASTM Method E-96-63T, respectively.

The good barrier properties of these materials taken with the good optical and mechanical properties make them especially useful for the preparation of packaging materials such as films, and containers such as bottles, jars, cans, etc.

Thus, it can be seen from the foregoing detailed specification and examples that the present invention provides a process for preparing a novel graft copolymer for blends with rigid matrices having highly desirable optical and mechanical properties. The graft copolymers are particularly useful as an impact modified for acrylonitrile-styrene copolymers high in acrylonitrile content. The graft copolymers and the matrix polymer are prepared so as to have closely matching refractive indices in order to provide optimum mechanical properties and optimum optical properties including a high degree of transparency.

The present invention may be utilized to produce materials which are particularly advantageously employed in packaging and in outdoor applications.

What is claimed is:

1. A process for preparing rubber modified nitrile polymer compositions which comprises:

A. admixing 1. a rubbery polymer substrate having a butadiene content of 68 to 72 percent by weight and a styrene content of 28 to 32 percent by weight based on the total weight of the butadiene-styrene rubbery substrate which rubbery substrate is further characterized as having a refractive index in the range of from 1.5375 to 1.5425, a particle size in the range of from 0.06 to 0.2 micron, a gel content in the range of from 40 to 95 percent, a swelling index in the range of from 10 to 40, and a second order transition temperature (Tg) less than −40°C.; and 2. a first polymerizable monomer composition comprising:

a. from 0.1 to 2 percent by weight of a nonconjugated diolefin monomer;
        b. from 0 to 30 percent by weight of an ethylenically unsaturated nitrile monomer selected from the group consisting of acrylonitrile, and mixtures of acrylonitrile and methacrylonitrile;
        c. from 40 to 60 percent by weight of a vinylidene aromatic hydrocarbon monomer; and
        d. from 20 to 50 percent by weight of an alkyl ester of acrylic or methacrylic acid wherein the alkyl group contains from 1 to 8 carbon atoms, wherein the percent by weight is based on the total weight of the monomer in the first polymerizable monomer mixture;

B. heating the admixture to a temperature in the range of from 30° to 100°C. in the presence of a polymerization catalyst to effect polymerization of said monomer formulation and grafting of the polymer being produced onto the rubbery polymer substrate to form a graft copolymer, said graft copolymer having a superstrate to substrate ratio of at least 10:100;

C. admixing said graft copolymer with a second polymerizable composition comprising from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile and from 15 to 45 percent by weight of a monovinylidene aromatic hydrocarbon monomer wherein the percent by weight is based on the total weight of the monomers in the second polymerizable monomer mixture; and D. heating the second mentioned admixture to a temperature in the range of from 30° to 100°C. in the presence of a polymerization catalyst to effect polymerization of the monomers thereof and to produce grafting of the polymer being produced onto said graft copolymer to form a composite graft copolymer, said grafted polymers of said first and second admixtures providing a grafted superstrate which contains a total of at least 40 percent by weight ethylenically unsaturated nitrile monomer and wherein the ratio of grafted superstrate to substrate is in the range of from 15–200:100;

E. blending the polymerization product of steps A to D above with a matrix polymer which comprises from 55 to 85 percent, based on the total weight of the polymer, of an ethylenically unsaturated nitrile monomer selected from the group consisting of acrylonitrile and mixtures of acrylonitrile and methacrylonitrile which contain up to 20 percent by weight of methacrylonitrile based on the total weight of acrylonitrile and methacrylonitrile and from 15 to 45 percent of a monovinylidene aromatic hydrocarbon monomer;

wherein the resulting blend contains from 3 to 50% by weight of the rubbery polymer substrate.

2. A process as in claim 1 wherein up to 5 percent by weight of the butadiene in the rubbery substrate is replaced with acrylonitrile.

3. A process as in claim 1 wherein said first-mentioned polymerizable monomer formulation contains acrylonitrile, a monovinylidene aromatic hydrocarbon monomer, methyl methacrylate and ethylene glycol dimethacrylate.

4. A process as in claim 1 wherein the second polymerizable monomer mixture contains acrylonitrile and styrene.

5. A process as in claim 1 wherein the nitrile monomer used in the first polymerizable monomer is a mixture of acrylonitrile and methacrylonitrile.

6. A process as in claim 1 wherein the nitrile monomer used in the second polymerizable monomer is a mixture of acrylonitrile and methacrylonitrile.

7. A process as in claim 1 wherein the graft polymerization is carried out in an aqueous medium.

8. A process for preparing rubber modified nitrile polymer compositions which comprises:
   A. admixing
      1. a rubbery polymer substrate having a butadiene content of 68 to 72 percent by weight and a styrene content of 28 to 32 percent by weight based on the total weight of the butadiene-styrene rubbery substrate which rubbery substrate is further characterized as having a refractive index in the range of from 1.5375 to 1.5425, a particle size in the range of from 0.06 to 0.2 micron, a gel content in the range of from 40 to 95 percent, a swelling index in the range of from 10 to 40, and a second order transition temperature (Tg) less than −40°C.; and
      2. a first polymerizable monomer composition comprising:
         a. from 0.1 to 2 percent by weight of a nonconjugated diolefin monomer;
         b. from 20 to 30 percent by weight of an ethylenically unsaturated nitrile monomer selected from the group consisting of acrylonitrile; and mixtures of acrylonitrile and methacrylonitrile;
         c. from 40 to 60 percent by weight of a vinylidene aromatic hydrocarbon monomer selected from the group consisting of styrene and alpha methyl styrene; and
         d. from 20 to 50 percent by weight of methyl methacrylate;
   B. heating the admixture to a temperature in the range of from 30° to 100°C. in the presence of a polymerization catalyst to effect polymerization of said monomer formulation and grafting of the polymer being produced onto the rubbery polymer substrate to form a graft copolymer, said graft copolymer having a superstrate to substrate ratio of at least 10:100;
   C. admixing said graft copolymer with a second polymerizable composition comprising from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile and from 15 to 45 percent by weight of a monovinylidene aromatic hydrocarbon monomer wherein the percent by weight is based on the total weight of the monomers in the second polymerizable monomer mixture; and
   D. heating the second mentioned admixture to a temperature in the range of from 30° to 100°C. in the presence of a polymerization catalyst to effect polymerization of the monomers thereof and to produce grafting of the polymer being produced onto said graft copolymer to form a composite graft copolymer, said grafted polymers of said first and second admixtures providing a grafted superstrate which contains a total of at least 40 percent by weight ethylenically unsaturated nitrile monomer and wherein the ratio of grafted superstrate to substrate is in the range of from 15–200:100;
   E. blending the polymerization product of steps A to D above with a matrix polymer which is the polymerization product which comprises 60 to 85 percent by weight, based on the total weight of the polymer, of an ethylenically unsaturated nitrile monomer selected from the group consisting of acrylonitrile and mixtures of acrylonitrile and methacrylonitrile which contain up to 20 percent by weight of methacrylonitrile based on the total weight of acrylonitrile and methacrylonitrile and from 15 to 45 percent of a monovinylidene aromatic hydrocarbon monomer;

wherein the resulting blend contains from 3 to 50% by weight of the rubbery polymer substrate.

* * * * *

UNITED STATES PATENT OFFICE
CERTIFICATE OF CORRECTION

PATENT NO. : 3,900,528
DATED : August 19, 1975
INVENTOR(S) : Ludwig A. Beer

It is certified that error appears in the above-identified patent and that said Letters Patent are hereby corrected as shown below:

Column 2, line 48, "0.1 1" should read --- 0.1 to 1 ---.

Column 3, line 8, "daillyl" should read --- diallyl ---.

Column 3, line 24, "abofe" should read --- above ---.

Column 4, line 39, "10-90:100" should read --- 20-90:100 ---.

Signed and Sealed this twenty-fifth Day of November 1975

[SEAL]

Attest:

RUTH C. MASON
Attesting Officer

C. MARSHALL DANN
Commissioner of Patents and Trademarks